(12) United States Patent
Schwarzbauer et al.

(10) Patent No.: US 8,522,219 B2
(45) Date of Patent: *Aug. 27, 2013

(54) AUTOMATIC CONTEXT MANAGEMENT FOR WEB APPLICATIONS WITH CLIENT SIDE CODE EXECUTION

(75) Inventors: Gunter Schwarzbauer, Linz (AT); Helmut Spiegl, Linz (AT); Ernst Ambichl, Altenberg (AT); Bernd Greifeneder, Linz (AT)

(73) Assignee: Borland Software Corporation, Austin, TX (US)

( * ) Notice: Subject to any disclaimer, the term of this patent is extended or adjusted under 35 U.S.C. 154(b) by 390 days.

This patent is subject to a terminal disclaimer.

(21) Appl. No.: 12/972,403

(22) Filed: Dec. 17, 2010

(65) Prior Publication Data

US 2011/0173526 A1 Jul. 14, 2011

Related U.S. Application Data

(63) Continuation of application No. 10/676,227, filed on Sep. 30, 2003, now Pat. No. 7,877,681.

(60) Provisional application No. 60/431,055, filed on Dec. 5, 2002.

(51) Int. Cl.
*G06F 9/45* (2006.01)
*G06F 9/445* (2006.01)

(52) U.S. Cl.
USPC .......................... 717/143; 717/141; 717/142

(58) Field of Classification Search
USPC ........................ 717/139–149; 714/15–17, 23
See application file for complete search history.

(56) References Cited

U.S. PATENT DOCUMENTS

| 5,951,694 | A  | * | 9/1999  | Choquier et al. ............. 714/15 |
| 5,968,127 | A  | * | 10/1999 | Kawabe et al. ............. 709/226 |
| 6,397,253 | B1 |   | 5/2002  | Quinlan et al. |
| 6,549,944 | B1 |   | 4/2003  | Weinberg et al. |
| 7,293,232 | B2 | * | 11/2007 | Arkhipov et al. ............ 715/264 |
| 7,426,721 | B1 | * | 9/2008  | Saulpaugh et al. ........... 717/144 |
| 7,519,948 | B1 | * | 4/2009  | Cornish ...................... 717/117 |
| 7,571,431 | B2 | * | 8/2009  | Hampapuram et al. ...... 717/141 |
| 7,650,597 | B2 | * | 1/2010  | Bohlmann et al. ........... 717/136 |
| 7,665,068 | B2 | * | 2/2010  | Neumann et al. ............ 717/125 |
| 7,730,467 | B1 | * | 6/2010  | Hejlsberg et al. ............ 717/143 |
| 7,735,071 | B2 | * | 6/2010  | Abrams et al. ............... 717/141 |
| 7,818,729 | B1 | * | 10/2010 | Plum et al. .................. 717/140 |
| 7,925,659 | B2 | * | 4/2011  | Wefers et al. ................ 707/756 |
| 8,087,009 | B1 | * | 12/2011 | Cornish ...................... 717/143 |

(Continued)

OTHER PUBLICATIONS

Ferro et al, "Efficient incremental parsing for context free language", IEEE, pp. 241-252, 1994.*

(Continued)

*Primary Examiner* — Anil Khatri

(74) *Attorney, Agent, or Firm* — DLA Piper LLP US

(57) ABSTRACT

A recorder, comprising: a context analyzer configured to associate HTTP transactions of a web application with a web session, wherein the web application executes code on the client side; an extensible document parser configured to parse a document included in the HTTP transactions; a library of parser additions used by the context analyzer to generate a context-full replay instruction; and a script generator configured to record a script including the context-full replay instruction in order to recreate the HTTP transactions in order to simulate use of the web application by a user.

18 Claims, 14 Drawing Sheets

Recorder Architecture

(56) References Cited

U.S. PATENT DOCUMENTS

| | | | |
|---|---|---|---|
| 8,196,122 B2* | 6/2012 | McCrady et al. | 717/144 |
| 8,285,654 B2* | 10/2012 | Bajrach | 706/14 |
| 8,302,082 B2* | 10/2012 | Zimmer et al. | 717/140 |
| 8,387,029 B2* | 2/2013 | Bird | 717/143 |
| 2002/0062342 A1 | 5/2002 | Sidles | |
| 2002/0091968 A1 | 7/2002 | Moreaux et al. | |
| 2003/0053420 A1 | 3/2003 | Duckett et al. | |
| 2003/0055883 A1 | 3/2003 | Wiles, Jr. | |

OTHER PUBLICATIONS

Prajapati et al, "High quality web application development on Java EE Platform", IEEE, pp. 1664-1669.*

Minamide et al, "Static approximation of dynamiclaly generated web pages", ACM, pp. 432-441, 2005.*

Kuno et al, "The augmented predictive analyzer for context free language its relative efficiency", ACM, vo. 9, No. 11, pp. 810-823, 1966.*

\* cited by examiner

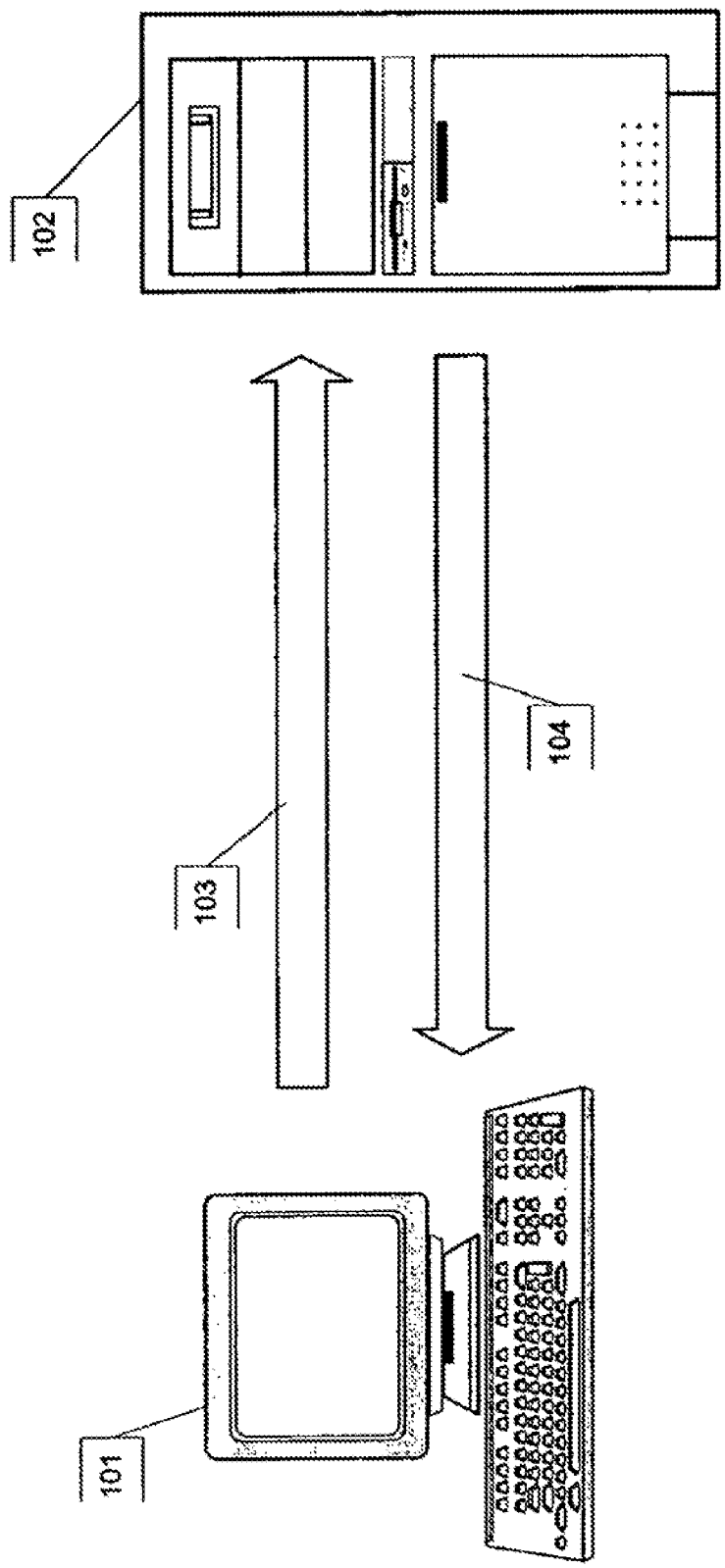
Background - Figure 1: HTTP Protocol

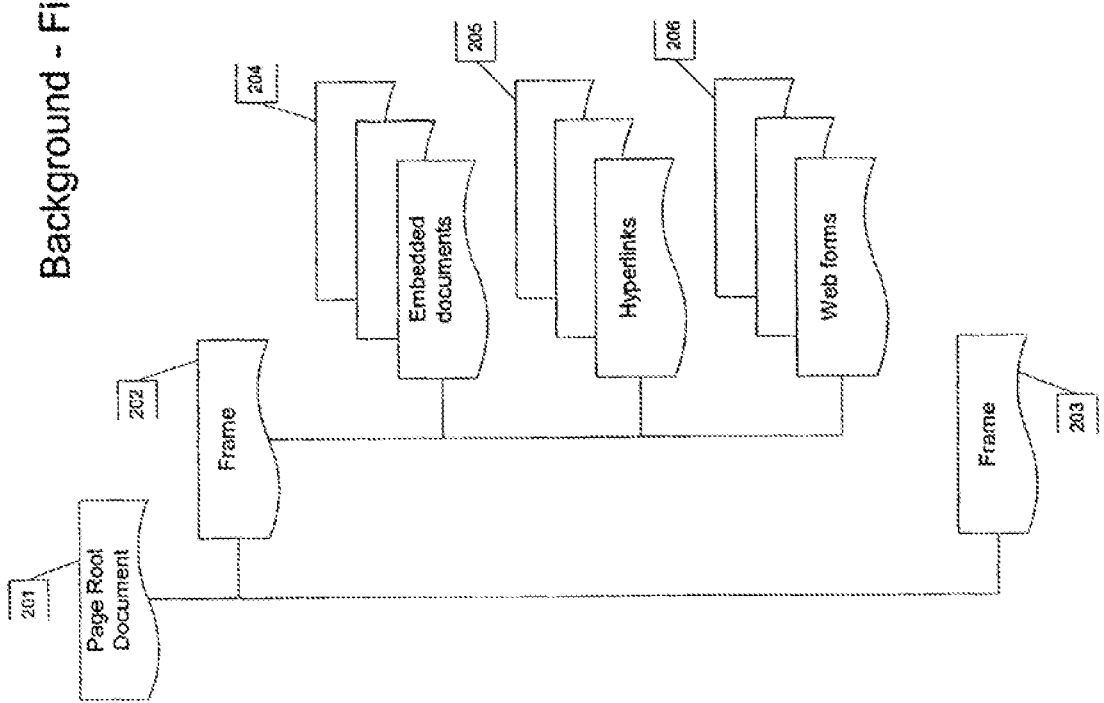

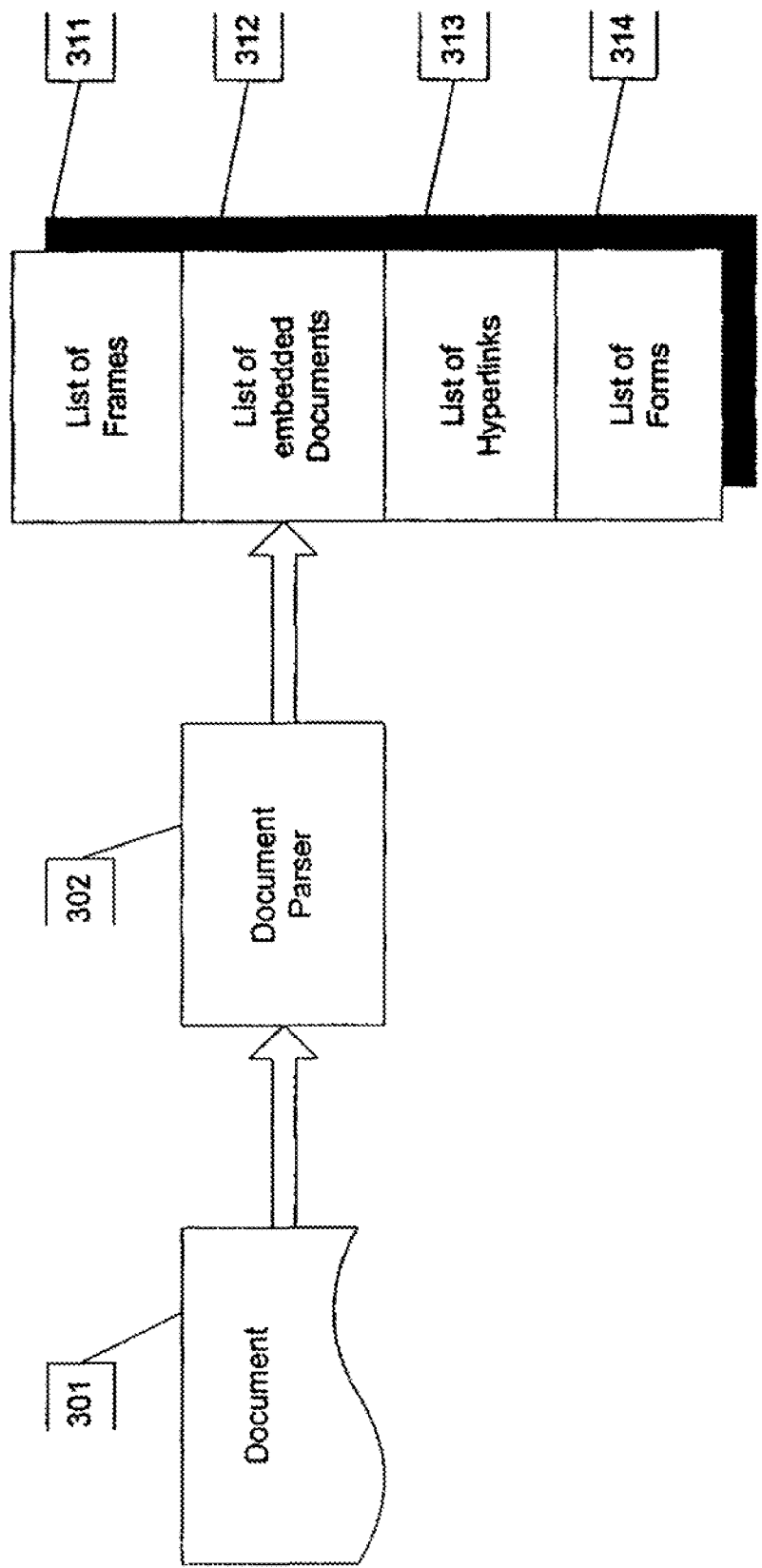
Background - Figure 3: Document Parser

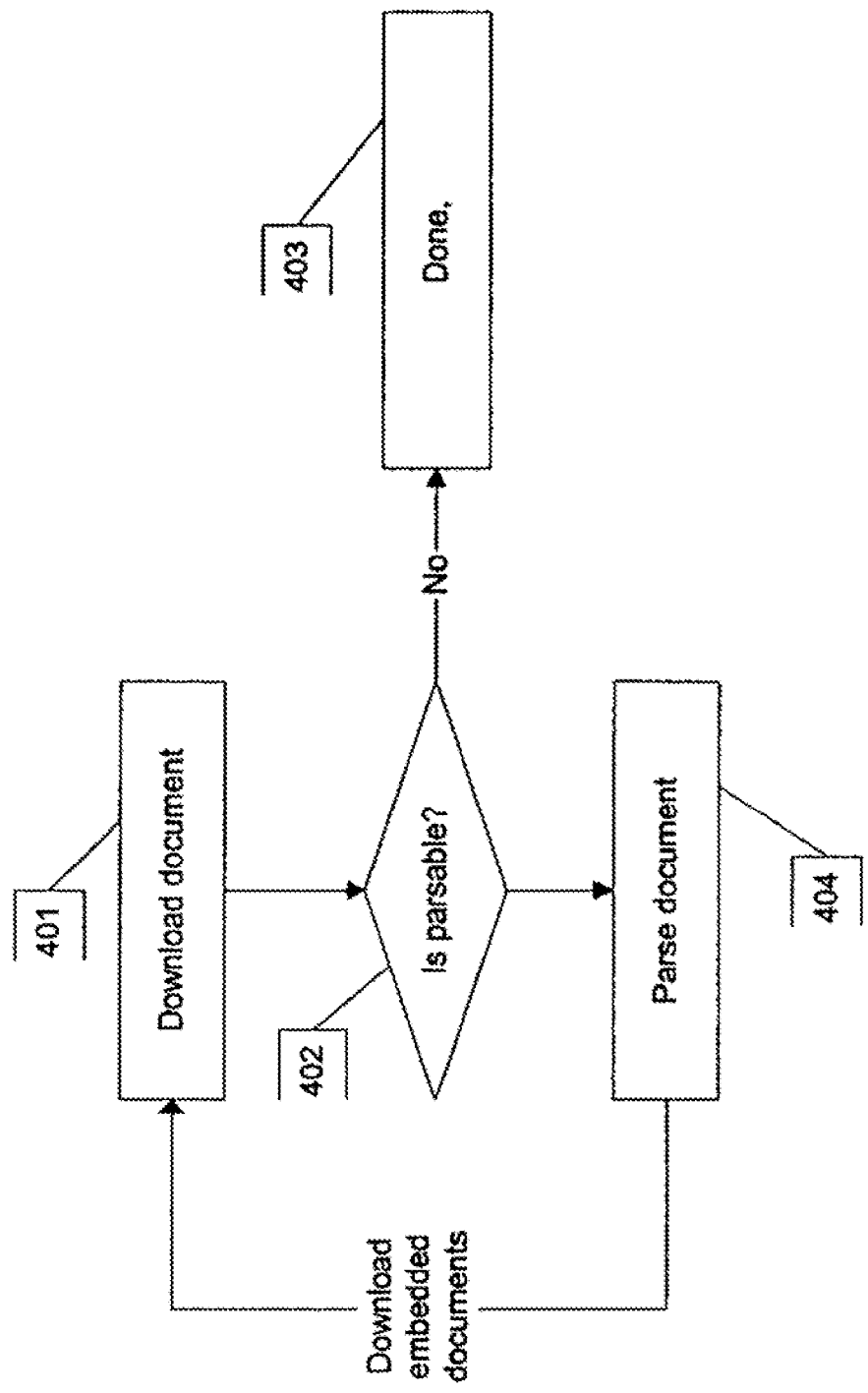

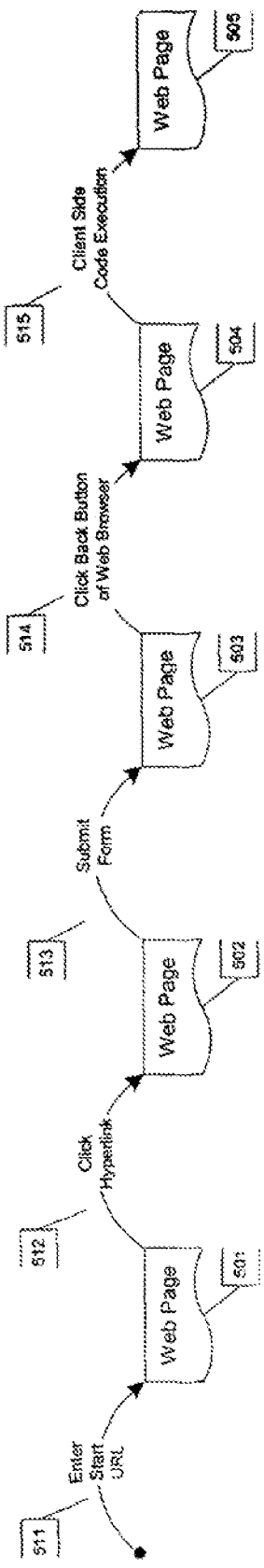
Background – Figure 5: User Session

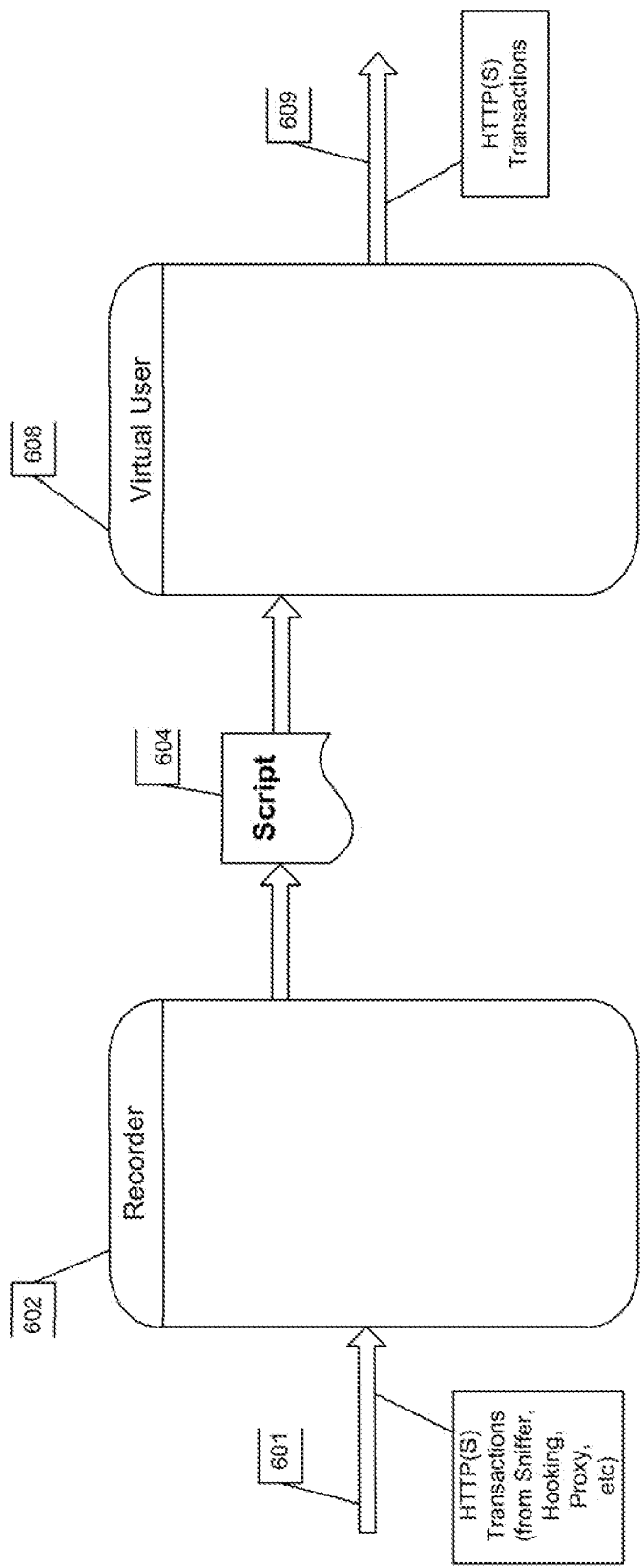
Figure 6: Record / Replay Overview

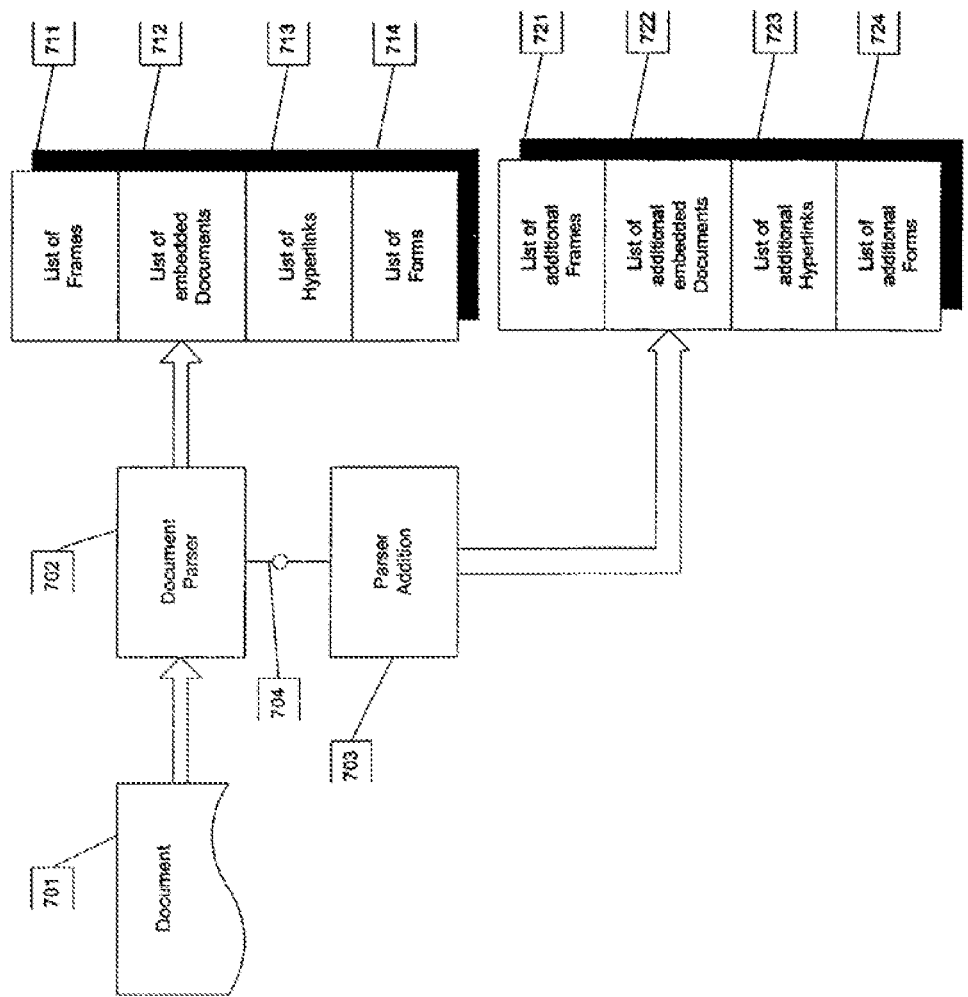
Figure 7: Extensible Document Parser

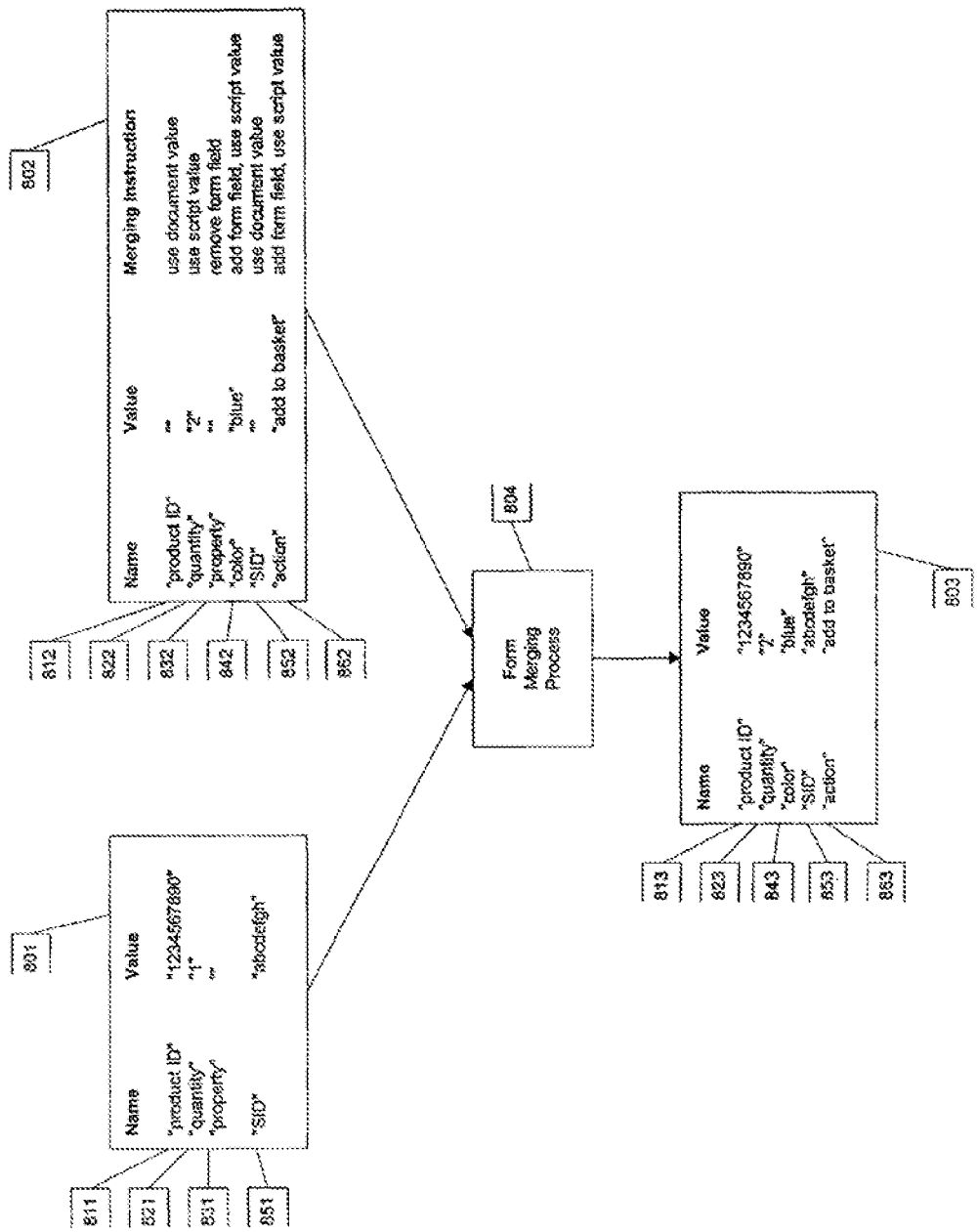
Figure 8: Form Merging

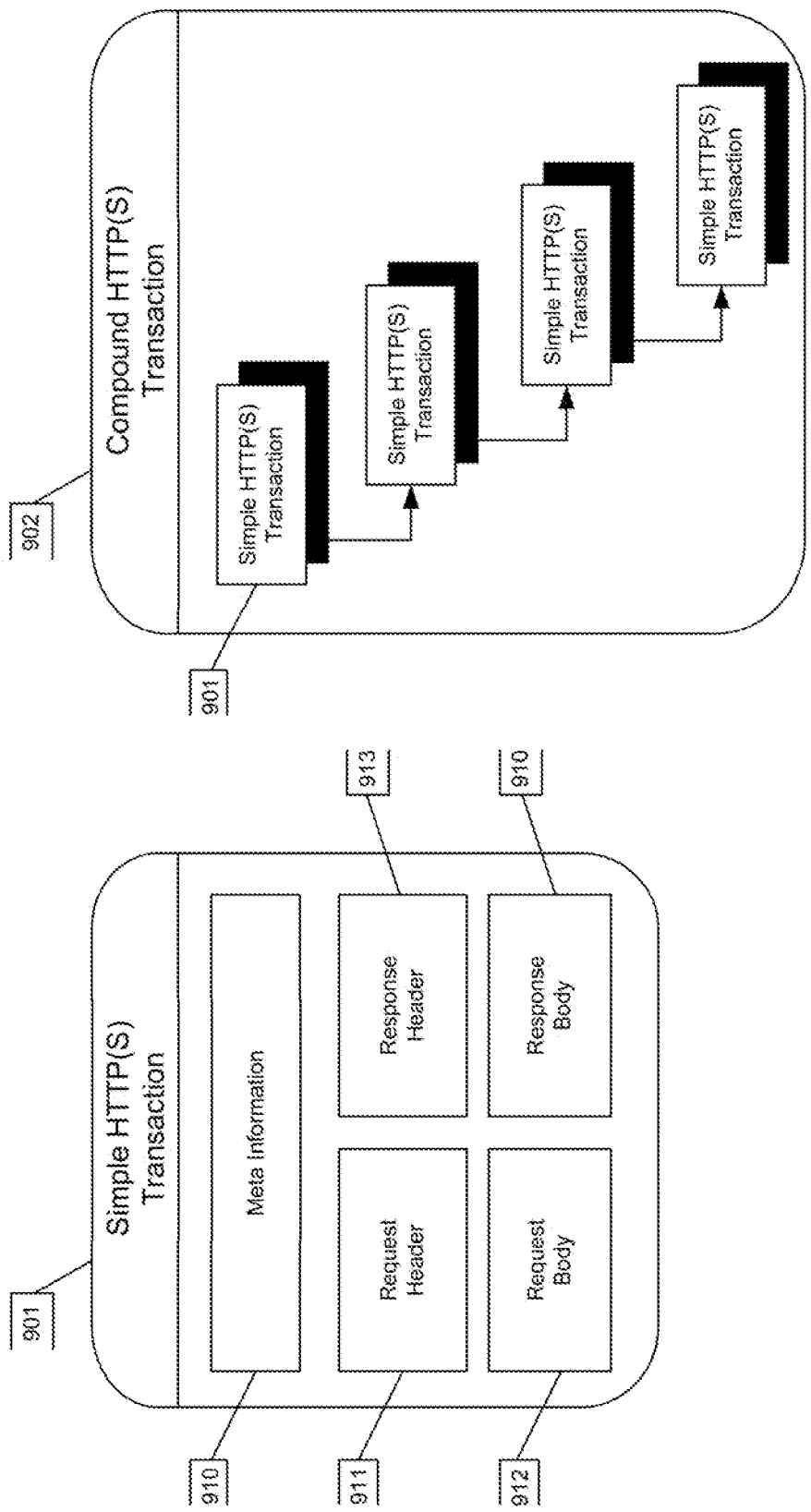
Figure 9: Recorder Input

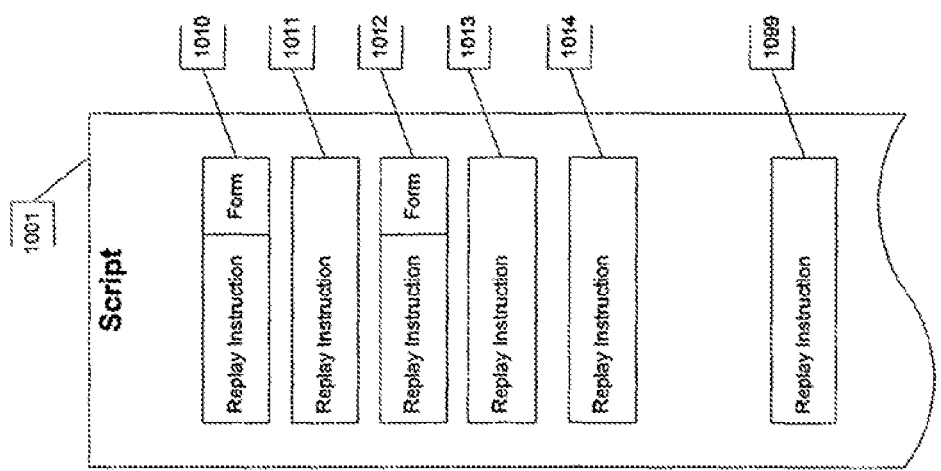
Figure 10: Recorder Output

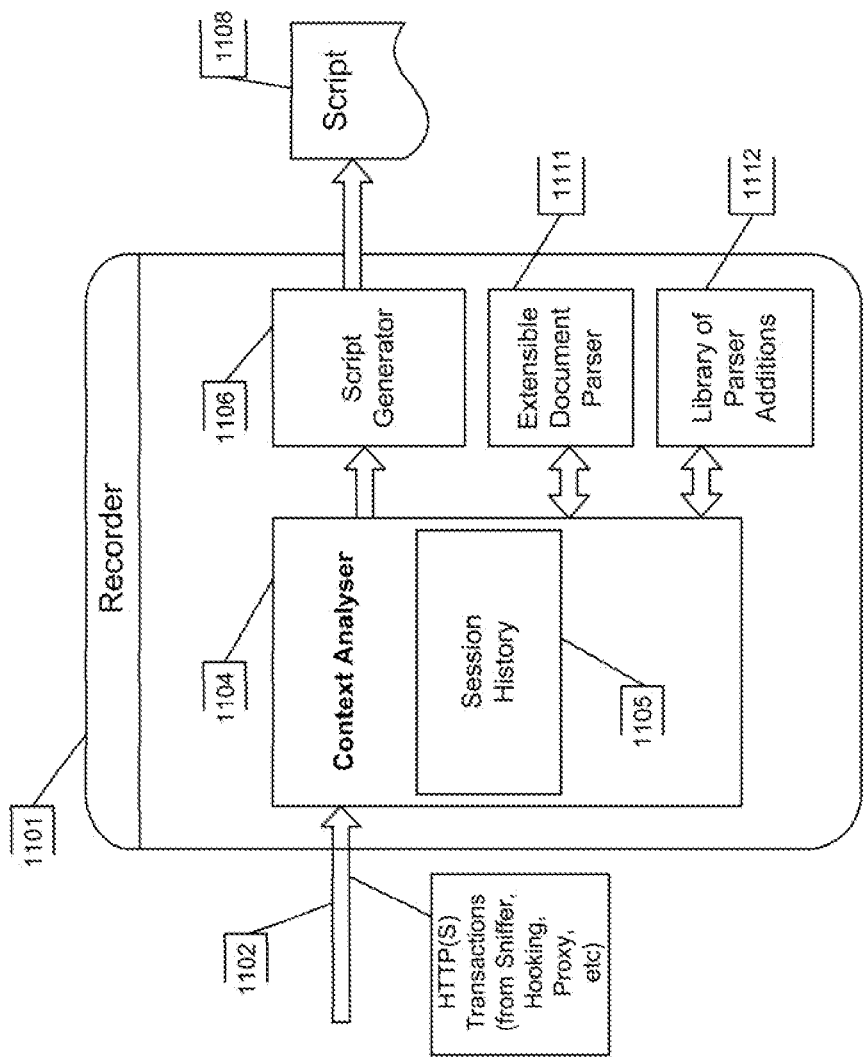
Figure 11: Recorder Architecture

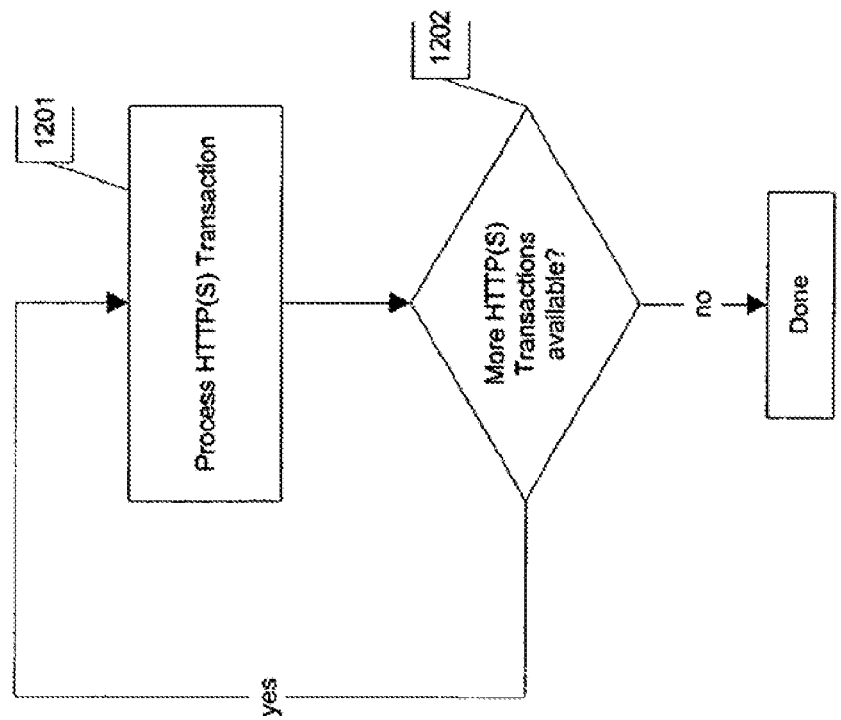

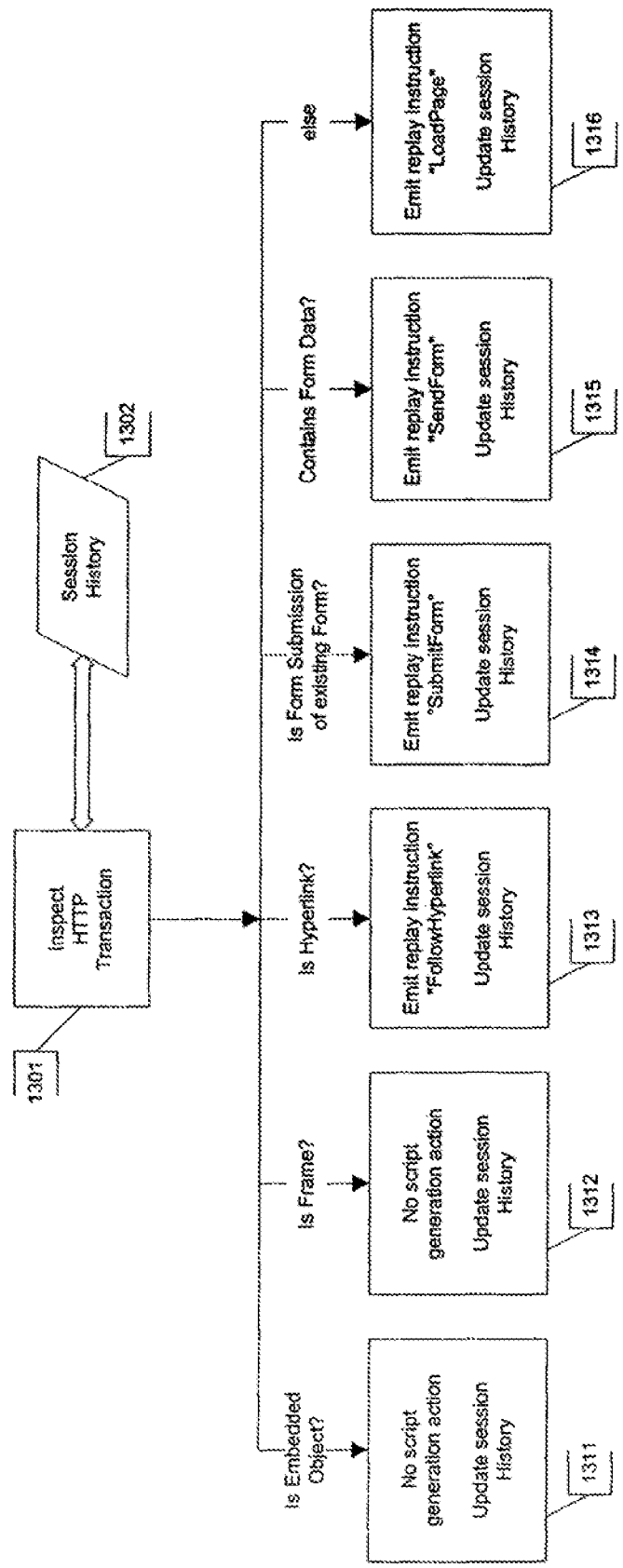
Figure 13: Recorder Processing HTTP Transaction (Prior Art)

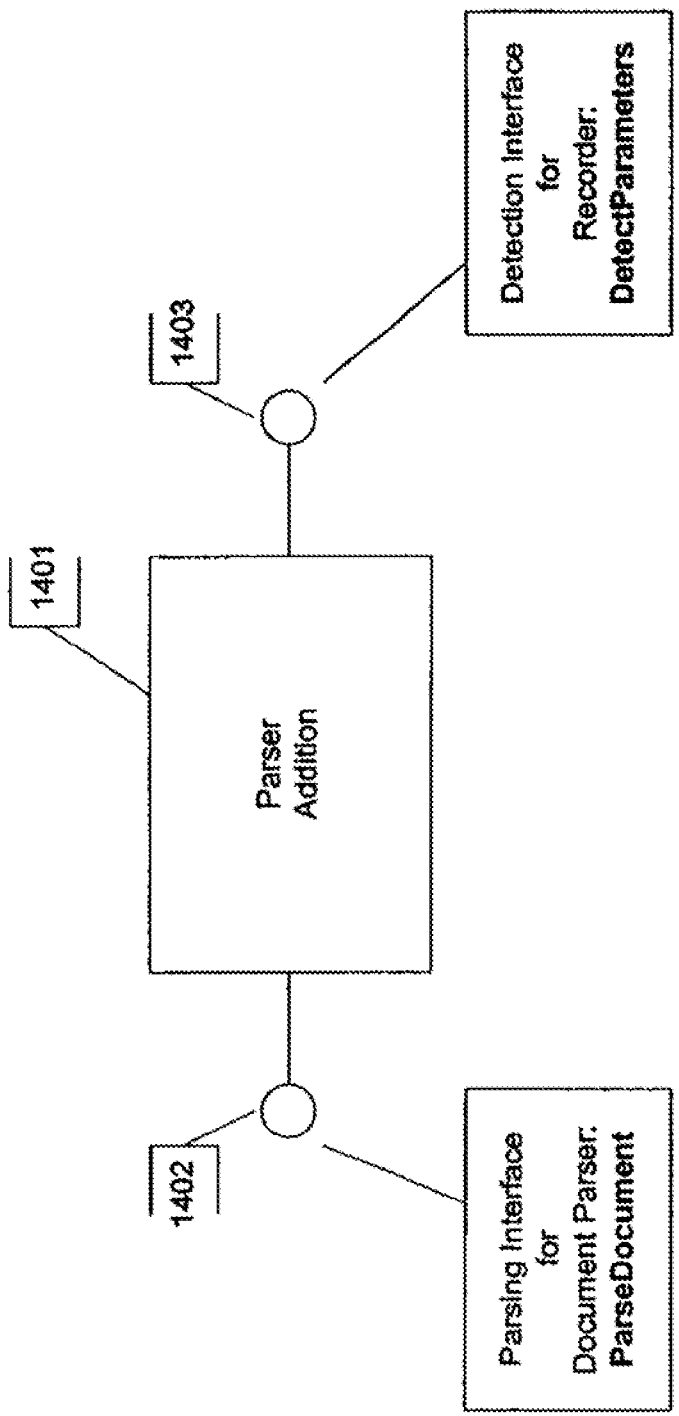
Figure 14: Parser Addition, Interface

AUTOMATIC CONTEXT MANAGEMENT FOR WEB APPLICATIONS WITH CLIENT SIDE CODE EXECUTION

CROSS REFERENCE TO RELATED APPLICATIONS

This application is a continuation of U.S. patent application Ser. No. 10/676,227 filed Sep. 30, 2003 now U.S. Pat. No. 7,877,681 entitled "Automatic Context Management For Web Applications With Client Side Code Execution," which claims priority to U.S. Provisional Patent Application No. 60/431,055 filed Dec. 5, 2002 entitled "Automatic Context Management For Web Applications With Client Side Code Execution," which is incorporated herein by reference for all purposes.

FIELD OF THE INVENTION

The present invention generally relates to the field of computer applications and systems, and more specifically to a method and apparatus for testing, monitoring, and automating network applications and other fields where web client simulations are used.

BACKGROUND

Testing, monitoring, automation, and other web client simulation tools, consecutively called simulation tools, often use a recorder to automatically generate scripts that simulate user activity for repeated replay. For example, load testing tools can simulate large numbers of users using multiple technologies and allow businesses to predict the behavior of their e-business web application before it is introduced for actual use, regardless of the size and complexity of the application. A reliable load testing tool can simulate the activities of real users of various profiles who use web clients such as web browsers to access the web server. The load testing tool can simulate the activities of a maximum expected number of users, maintain a steady number of users over a certain period of time, or stress a single component of the web application. The load testing tool measures performance, reliability, accuracy and scalability and as such can reveal a wide range of possible errors. The load testing tool simulates real users by using virtual users that effect client-server interaction on the protocol level, not the graphical user interface (GUI) level. By performing a load test, businesses can test the performance, scalability, and reliability of the web application.

A load testing tool for web applications includes a controller, multiple agents, and multiple virtual users. The controller manages and monitors the load test. The agents are connected to the controller and run on the same computer as the controller or on remote computers. Each agent hosts multiple virtual users. Each virtual user makes requests to and receives responses back from the web application on the web server. The request contains the URL of the document to be retrieved from the server, and the response contains the document itself and information about the type of document. The document can be, for example, an HTML document, an image, a PDF™ file, a JavaScript™ file, or a plain text file.

A simulation tool incorporates a replay engine which simulates virtual users 608 with respect to the network traffic they generate 609, as shown in FIG. 6. A script 604 is a series of instructions which are input to the replay engine and can be in any format the replay engine understands (e.g., textual script written in a programming language, instructions stored in a database, or XML). A script can be written using a software tool like a text editor.

However, the most convenient way of generating a script is to use a recorder 602 which generates scripts 604 based on the HTTP(S) transactions 601 resulting from a real user using the web application. The recorder records into one or more scripts the actions of the real user such as clicking on hyperlinks, submitting forms, transitioning back and forth in the session history (e.g. using a web browser back button), and pausing between activity.

The recorded scripts are then replayed simultaneously to simulate the user interactions of many users in order to test the server. The scripts for each virtual user are executed concurrently by the replay engine to generate the desired load on the test environment. Each component of the test environment can be monitored in real-time during the load test replay to allow the testers to view the web application's performance at any time. The results of the load test replay can be analyzed to improve weaknesses and address errors in the web application. The scripts can be rerun to verify the adjustments.

Real users interact with a web application using a client program on a computer 101 that calls upon services provided by a server program as shown in FIG. 1. The client program can be a web browser that requests services from a web server 102, which in turn responds to the request by providing the services. This interaction is in the form of HTTP requests 103 and responses 104.

Virtual users do not interact with the web application using a client program since this would involve running a client program for each individual virtual user. Running separate client programs for each virtual user is impractical for a load test because it wastes resources. Instead, the interactions of each virtual user with the web server take place on the protocol level. Therefore, in conventional load testing tools, the scripts display user interactions in the form of HTTP requests. The recorder records network activity between the client application and the server. Recorders used in load testing do not record activity within the client application such as the movement of each user's mouse or the specific keystrokes that each user performs.

A web page, as shown in FIG. 2, includes one or more documents received from the web server. Each document is received by sending one HTTP request (or more than one request when there are redirections). A web page forms a tree which has a root document 201 and leaves. A root document is a document that can have one or more embedded sub-documents 202, 203 such as HTML documents, images, embedded objects, frames, scripts, applets, and style sheets. Leaves 204 are documents, such as images, style sheets, and plain text, that cannot have sub-documents. The visual representation of a web page is exactly what the real user sees when using the web browser. Documents can also contain hyperlinks 205 and forms 206, which are not separate documents. A user can click on a hyperlink to transition to another web page having the URL associated with the hyperlink. Forms can be completed and submitted to the server by the user, thereby causing a transition to another web page having the URL associated with the form. Web pages can also include executable code that is executed by the web browser (e.g. JavaScript™, VBScript™, and Java™ applets). The executable code can be embedded in HTML documents or contained in sub-documents.

FIG. 5 shows a session history, which is a sequence of web pages that are downloaded or retrieved from a client side cache. The interaction of the user with the web application is called a user session. The session begins when the user starts the browser and navigates to the web application. The session ends when the user closes the browser or navigates to a different web application. The URL of the first page 501 is specified by the user, e.g., by entering the URL in the address bar of the browser 511 or by clicking on a "bookmark". Each successive page 502, 503, 504, 505 is the result of a page transition from one page to the next page. A page transition can be caused by the user clicking a hyperlink 512, the user filling in and submitting a form 513, by the user navigating in the browser's page history by clicking the "back" or "forward" button 514, or by the browser executing client side code 515.

Although the HTTP protocol is a stateless protocol, complex web applications need to be able to relate a single request to one or more preceding requests. Such requests are common in web applications that use session IDs, shopping carts, user IDs, and other forms of state information. These forms of state information can be in the form of unique strings of characters that are placed in requests or responses, as well as the transferred documents such as HTML. The unique string appears hard-coded in each related request and response. Real clients such as web browsers can correctly identify state information in responses and can also correctly embed such state information in subsequent requests.

For example, a session ID is a unique string of characters that a web application assigns to all responses within a period of time in which a client and a server interact. The client then returns the session ID within a request to the server so that the web application can determine which client sent the request. A shopping cart is commonly used in e-business applications to handle catalogs of items that an individual user would like to purchase. User IDs are assigned by a web application to identify a particular user. If a simulation tool cannot correctly identify a session ID, a shopping cart ID, a user ID, or other forms of state information within a response and transfer it back to the server in subsequent requests, the simulation tool does not correctly simulate real clients. This may lead to invalid test results or even errors which in fact are not errors of the web application but rather an artifact of the simulation tool being unable to simulate real clients properly.

Conventional load testing tools can only handle standardized state information called cookies. All other forms of state information can, if at all, only be handled by manually customizing the script.

Context management is the ability of a testing tool to: a) manage state information during replay by dynamically analyzing content for state information, even when the content is generated dynamically and contains state information; b) properly transfer this state information back and forth in requests and responses; c) restructure received documents (one or more HTTP(S) transactions) into web pages; and d) maintain a session history to allow virtual users to transition back and forth between web pages in the session history.

Missing or poor context management of a simulation tool can result in the mishandling of state information which ultimately can lead to a failed, unreliable, and ineffectual load test. For example, when multiple virtual users log into the same account or session due to incorrect state management, the load on the web application does not correctly model the real intended behavior of the live application. Accurate simulation/testing tools would create one session per virtual user. Poor context management of a load testing application, in particular, can lead to inaccurate test results or failed tests. Missing automatic context management by the simulation tool must be compensated by large efforts to customize scripts manually for correct state management, thereby resulting in high costs and lost revenue.

State management may be achieved using state information which can be included as a unique string in cookies, URLs of links or embedded objects, or form fields. The string acts as a session ID or other ID such as an encryption ID or a serialized object reference to an object residing at the server which is placed in a hidden field. The string allows the server to identify the unique web session in which the original request originated or other state information, and the string is returned by the browser to the server as part of any subsequent request, thus relating the requests.

In a simulation tool without state management, the hard-coded session ID is sent to the server when replaying the script. However, since the specific session ID does not correctly identify the replayed session, this replay does not run correctly. The session ID only identifies the session ID of the recorded session and cannot be used again for the replayed session. Therefore, a script that uses such state information is unsuitable for a proper load test, and the web application will most likely generate errors during replay since sessions are usually terminated by the web server after a predetermined period of time. Load testing tools without state management generate scripts that must thus be customized, manually or via a tool, to handle state information such as session IDs in web applications in order to avoid such problems.

Conventional simulation tools use a HTTP-level replay or a page-level replay to execute scripts. A low-level, HTTP-level replay executes script instructions that specify single HTTP transactions. The information for each HTTP transaction, such as the URL and form data, is specified in the script. Because of this, session information, which is part of these URLs, and form data are hard-coded in the script and are not dynamically parsed out of documents during runtime. A HTTP-level API is therefore not suited for automatic state management and does not provide context management as well.

In contrast, a conventional simulation tool with a page-level replay executes script instructions that specify complete web pages that can include various images and frames to be downloaded. The replay engine uses a document parser (e.g. HTML parser) to obtain the URLs referencing embedded objects and frames at replay time. Since downloading a single web page using the page-level API automatically initiates HTTP requests for also downloading embedded objects or frames, the page-level script is typically shorter than the HTTP-level script. The page-level script can also automatically obtain state information which may be contained in URLs referencing frames and embedded objects in real time. Such state information is contained in URLs embedded in HTML tags of HTML documents and parsed in real time, but is not hard-coded in the page-level script.

The present invention includes a recorder which is able to identify the context of web page transitions by analyzing the HTTP(S) network traffic even for web applications that use client side code execution. Conventional recorders can also record context-full page-level scripts for web applications without client side code, but fail in many cases to do so if the web application uses client side code.

Both a web browser and the replay engine of a conventional simulation tool that is capable of a page-level replay follow the same steps when downloading a web page from a web server. Documents are downloaded (step 401) by the client from the server as shown in FIG. 4, starting with the root document. If a downloaded document is parsable (step 402) (e.g. an HTML document), a standard HTML parser parses the document (step 404). A standard HTML parser parses each HTML document as it is received by the client from the web server so that embedded objects and frames can be detected and downloaded automatically. Since the conventional page-level API function call requests all embedded objects and frames in the root document, the standard HTML parser specifically looks for these embedded objects and frames in the HTML document. The standard HTML parser also looks for hyperlinks and forms in the HTML document so that they can be referenced in subsequent API calls when transitioning between web pages.

As shown in FIG. 3, the standard HTML parser 302 parses an HTML document 301 and can output a list of frames 311, a list of embedded documents 312, a list of hyperlinks 313, and a list of forms 314, each with their associated URLs. Each embedded object and frame is downloaded following the same procedure of FIG. 4 in a recursive way. A document that is not parsable stops the recursion (step 403).

The conventional recorder uses the HTML parser to analyze the HTML documents wherein a single HTML document is retrieved by one (or more when there are redirections) HTTP requests. Conventional recorders save some state information hard-coded in the API call parameters in the script.

Page-level replay instructions can be "context-full" or "context-less", depending on how a page transition is specified by the replay instruction. A "context-less" replay instruction can be executed by the replay engine using information only specified in the script. A context-less replay instruction includes the URL of the root document to download and optional replay instructions that send form data without referring to a form contained in a previously downloaded web page. Both the URL and all form field names and values are specified in the script, possibly containing hard-coded state information.

The term "context-less" refers to the fact that the replay engine can execute such a replay instruction without using the context of the user session executed so far. No references to previously downloaded web pages in the user session exist, and no dynamic data from previously downloaded web pages is used.

A "context-full" replay instruction is a replay instruction which refers to a previously downloaded page. The term "context-full" refers to the fact that the replay engine can execute the replay instruction only within the context of the replay session up to the point where the context-full replay instruction is executed. Without a session history, the replay engine would not be able to collect the data needed to perform a context-full replay instruction.

The replay engine identifies the HTML document and all of the information associated with the particular HTML document such as the embedded images and frames that form the HTML document. All of the information is downloaded in real-time during the replay. There are no session IDs hard-coded in the script.

For example, a replay instruction can download a web page by following a hyperlink contained in the previously downloaded web page. To download the web page, the replay engine uses the document parser to obtain the URL that is associated with that hyperlink. The URL associated with the hyperlink is obtained in real-time during the replay. The script only contains the reference to the hyperlink, but not the URL, which might contain state information. A reference to a hyperlink may consist of several items, e.g., name of the hyperlink, ordinal number, name of containing frame, reference to the containing web page. These types of references typically do not contain state information.

In another example, a replay instruction submits a form which is contained in a previously downloaded web page, given a reference to that form. The replay engine uses the document parser to obtain the URL associated with the form, and the names and initial values of the form fields. The script only contains the name of the form and the values of form fields that are different from the original values (i.e. the values that have been edited by the user). The script does not contain the URL, which may contain state information. The script also does not contain the values of hidden or otherwise unchanged form fields, which also may contain state information. A reference to a form may consist of several items, e.g., name of the form, ordinal number, name of containing frame, reference to the containing web page. These types of references typically do not contain state information.

The page-level script can eliminate many of the URLs that contain state information since usually the URL for the first HTML document is the only URL hard-coded in the script. The URL typically corresponds to the first page specified by the virtual user and typically does not contain state information since it is the entry point to the web application. The other links are obtained dynamically during the replay as URLs which are obtained by parsing the downloaded HTML document during replay. These links correspond to context-full replay instructions in the script. By obtaining information dynamically, the use of hard-coded session IDs in the script can be avoided.

The capability of the replay engine for automatic state management by means of executing context-full replay instructions is called automatic context management. A page-level replay is suited for automatic context management for web applications that do not use client side code execution, i.e., each page transition is implemented by standard hyperlinks and form submissions.

The term "client side code execution" refers to code executed within the web browser by the client such as JavaScript™ code embedded in HTML documents or in separate JavaScript™ documents, Java™ applets, VBScript™, ActiveX™ controls, or browser plug-ins.

Code executed on the client side may dynamically assemble URLs and forms and cause page transitions using these URLs and forms. Such page transitions cannot be modeled by context-full replay instructions within a traditional page-level replay, because the URLs and forms may not correspond to any hyperlink or form contained in any previously downloaded web page.

The standard page level recorder/replay is sufficient for web applications that interact with client programs using standard HTML documents. However, a standard page level recorder/replay using a standard HTML parser is unable to parse code executed on the client side since it is unable to recognize URLs in the client side code. These URLs are recorded into the script, and this leads to errors during replay if these URLs contain hard-coded state information.

For a successful record/replay, the virtual users simulated by the testing tool need to behave similarly to a web browser. For instance, a real user downloads a JavaScript™ document referenced by an HTML document and executes the JavaScript™ when the page is viewed in the web browser. The JavaScript™ code can generate a direct HTTP request to the server. However, URLs included in JavaScript™ code that is executed on the client side are not recognized by a standard HTML parser since they do not appear as standard links, frames, forms, and embedded objects. If there is a URL coded in the JavaScript™, that URL is not recognized by a standard HTML parser so that the Page Level API could use this parsed URL (which might contain state information) for a contextful page transition or automatic load of an embedded object or frame. It is instead recorded as is, leading to context errors during replay.

The inability of the standard HTML parser to parse code such as JavaScript or applets makes it difficult to model accurately the interactions between the web application and the virtual users in a page-level API. Recorders of typical simulation tools may not be able to properly record context-full functions when code is executed on the client side and will record context-less functions instead.

The recorder cannot determine the context of an API function when it observes an HTTP request that cannot be interpreted as an embedded object, a frame, a link, a form, or any other entity that the standard HTML parser can detect. The standard HTML parser does not have the ability to identify the URLs generated during client side code execution. Therefore, the recorder records context-less function calls corresponding to the non-interpreted HTTP request.

The standard HTML parser cannot recognize a URL that is generated by executing client side code and therefore cannot associate the URL of the recorded HTTP transaction with any URL in the session history. Therefore, the recorder records a hard-coded URL in the API function call.

The scripts that are generated by a recorder using a standard HTML parser produce an unreliable load test replay when the replay engine executes a context-less replay instruction using hard-coded state information. The standard HTML parser is only able to identify URLs found in HTML tags such as hyperlinks and references to frames and embedded objects.

Client-side code causes actions that are performed by the client, rather than by executing web application code on the server. Code executed on the client side gives web developers increased functionality over standard HTML techniques and provides the client side portion of the web application with abilities such as loading a web document, loading embedded objects, and modifying HTML code and form values.

Conventional load testing tools exhibit poor context management when the conventional page-level recorder generates context-less function calls after code is executed on the client side. When the replay engine executes the context-less function call, the state information contained in the context-less function call may generate errors in the replay. These errors are generally unrelated to the performance of the web application under a load test, thereby leading to failed or unreliable test results.

State information can be handled properly by driving a web browser during the load test for each individual virtual user. A scalable, high-performance load testing tool does not drive Web browsers and as such does not execute client side code since this wastes resources. Instead, a virtual user accesses a web page on the protocol level during a load test. Running separate client programs for each virtual user is also unnecessary since a load testing tool is intended to test the server and not the client. The execution of application code for each virtual user during the load test has a heavy impact on scalability and performance measurement accuracy. Therefore, execution of client side code is especially not an option for a simulation tool that aims to simulate thousands of virtual users on a single agent machine.

Conventional load testing tools also exhibit poor context management when handling hidden form fields and form fields that are modified, added, or removed using code executed on the client side. Web applications commonly use hidden form fields to transfer session information when users complete and submit forms to the web application. Also, JavaScript™ and applets are commonly used to modify, add, and remove form fields. The standard HTML parser overlooks state information which is carried or generated by JavaScript or applets. Since the standard HTML parser cannot identify dynamically adjusted hidden form field information in the HTML document without executing the client side code, the session information commonly found in hidden form fields cannot be removed from scripts and subsequently obtained dynamically in the replay. Instead, the state information remains as hard-coded information in the recorded scripts in context-less API function calls.

As shown in FIG. 13, the recorder processes a HTTP transaction by inspecting the transaction (step 1301) using the session history 1302 to identify the role of the HTTP transaction within the session history.

If the HTTP transaction corresponds to an embedded object (step 1311), no replay instruction is added to the script. The session history is updated to reflect the fact that this embedded object has been downloaded.

If the HTTP transaction corresponds to a frame (step 1312), no replay instruction is added to the script. The session history is updated to reflect the fact that this frame has been downloaded.

If the HTTP transaction corresponds to a hyperlink (step 1313), a new context-full script instruction "FollowHyperlink" is recorded in the script along with parameters that allow the replay engine to reference the hyperlink during replay. A new web page is added to the session history resulting from following the hyperlink. However, this new web page in the session history is incomplete and will be populated with embedded documents and frames as the recorder processes the upcoming HTTP transactions.

If the HTTP transaction corresponds to a form submission of an existing form (step 1314), a new context-full script instruction "SubmitForm" is recorded in the script along with parameters that allow the replay engine to reference the form during replay and the names and values of the form fields that have been edited by the user. A new web page is added to the session history resulting from the form submission. However, this new web page in the session history is incomplete and will be populated with embedded documents and frames as the recorder processes the upcoming HTTP transactions.

If the HTTP transaction corresponds to neither a hyperlink nor a fowl submission, but contains form data (step 1315), a new context-less script instruction "SendForm" is recorded in the script along with the complete form data that is to be used for sending the form during script replay, including the URL to use and the complete list of names and values of the form fields. A new web page is added to the session history resulting from the form submission. However, this new web page in the session history is incomplete and will be populated with embedded documents and frames as the recorder processes the upcoming HTTP transactions.

If the HTTP transaction corresponds to neither a hyperlink nor a form submission and does not contain form data (step 1316), a new context-less script instruction "LoadPage" is recorded in the script, along with the URL that is to be used for loading the page during script replay. A new web page is added to the session history representing the new web page. However, this new web page in the session history is incomplete and will be populated with embedded documents and frames as the recorder processes the upcoming HTTP transactions.

If the HTTP transaction corresponds to neither a hyperlink nor a form submission (steps 1315 and 1316), the recorder records context-less script instructions to the script. The way the conventional recorder handles these cases is the reason why hard-coded state information is incorporated in recorded scripts.

In a conventional recorder, each document in the session history is inspected to find forms that exactly match the form being submitted in order to find a form that can be used for a context-full SubmitForm replay instruction. Forms match exactly if the action URL (i.e., the URL that defines where to send the data in the submitted form when the submit button is clicked or a similar action is performed) is identical, and the form being submitted contains all form fields of the form from the document in the session history.

However, the form being submitted may contain additional form fields not present in the form in the document in the session history. For instance, web browsers implicitly add the form fields "x" and "y" which contain the coordinates of the mouse click. Additionally, the form field values in the form being submitted may be different from the form field values in the form in the document in the session history because the user may have edited form field values, but the for his are considered identical since the form being submitted contains all form fields of the form from the document in the session history.

Only if an identical form is found, will the conventional recorder be able to record a context-full replay instruction such as "SubmitForm" with a reference to the form from the session history. If no such form is found in the session history, a conventional recorder records a contextless replay instruction such as "SendForm", which also requires recording in the script a complete specification of the form without using any dynamic information.

Scripts can be customized by the tester after recording the script, manually or by using a software tool. However, this method of context management is complex, error-prone, and time-consuming and wastes quality assurance (QA) resources.

BRIEF DESCRIPTION OF THE DRAWINGS

FIG. 1 is a block diagram of the interaction between a client and a server;
FIG. 2 is a block diagram of the structure of a web page;
FIG. 3 is a diagram of a conventional document parser;
FIG. 4 is a flowchart of a method for downloading a web page from a web server;
FIG. 5 is a diagram of a sample user session;
FIG. 6 is a diagram of the record/replay process for a simulation tool;
FIG. 7 is a diagram of an extensible document parser of the present invention;
FIG. 8 is a diagram of a method for merging forms according to the present invention;
FIG. 9 is a diagram of input to a recorder according to the present invention;
FIG. 10 is a diagram of output from a recorder according to the present invention;
FIG. 11 is a diagram of a recorder of the present invention;
FIG. 12 is a flowchart of a method for operating a recorder according to the present invention;
FIG. 13 is a flowchart of a method for processing HTTP(S) transactions using a conventional recorder; and
FIG. 14 is a diagram of interfaces of a parser addition according to the present invention.

DETAILED DESCRIPTION

The present invention relates to a method and apparatus for providing automatic context management for simulating real users with virtual users for testing and monitoring web applications, including those web applications that execute code on the client side, without requiring the actual execution of client side web application code or the execution of the client within the testing, monitoring, or simulation tool. Simulation tools with automatic context management according to the present invention can record and replay context-full scripts that do not require manual customization and are capable of handling state information even for web applications that execute code on the client side. These scripts are able to realistically mimic complex web application sessions on the network HTTP layer.

The present invention includes a context-full page-level replay for a simulation tool that uses a scripting language to model end-user behavior causing network activity between a web application and a user's web browser (client), an extensible document parser, a recorder that automatically records context-full scripts, and a context-full replay engine which is able to execute the context-full page-level API calls. FIG. 2A illustrates a rear view of an exemplary nursing cover.

An enhanced, extensible document parser can parse URLs that standard HTML parsers would overlook. The extensible document parser searches the entire HTML document for standard and nonstandard embedded objects, hyperlinks, and forms. Nonstandard hyperlinks and forms can be embedded, for example, in JavaScript™ code in HTML documents or in Java™ applets. FIG. 3 illustrates an alternative frontal view of an exemplary nursing cover when worn.

The extensible document parser can locate URLs in a client side code. These URLs are detected during the script record process and recorded into the script without hard-coded state information. During the replay process, the otherwise hard-coded state information is obtained in real-time.

During the record process, if the recorder cannot associate a URL with a hyperlink, frame or form in the session history, the extensible document parser determines the appropriate parser extensions to be recorded into the script, so that the URL can be obtained dynamically during script replay.

For example, the parser extension can include a name for the link, a left boundary string, and a right boundary string. The left and right boundary strings specify the unique strings of characters that appear to the left and right of the URL, respectively. Using the left and right boundary strings, the extensible document parser can search for and detect the URL in any document. Whenever the left and right boundary strings appear in an HTML document, the extensible document parser identifies that the parsed URL located between the two strings corresponds to the link having the name specified in the parser extension.

The recorder records parser extensions into the script for use by the replay engine. The recorder records the name and boundary value fields in a parser extension in the script in an API function call so that the replay engine can parse the URL that otherwise could not be parsed. Each set of parser extensions is specific to a particular parsed URL and avoids the use of hard-coded URLs in the recorded script.

The extensible document parser parses for nonstandard embedded objects, hyperlinks, and forms to find URLs and forms that may contain session IDs and other forms of state information that a recorder using a standard HTML parser would include in the script.

The present invention includes form merging instructions for the replay engine. The form merging instructions are a method of describing how a form contained in a previously downloaded web page must be merged with a form defined in the script to obtain the form that must be submitted.

In the presence of client side code execution, the user may submit a form that does not correspond exactly to any form in the HTML web pages in the user session at that time. In addition to changing all HTML in a web page, JavaScript™ can modify HTML forms prior to submission by modifying form field values, modifying hidden fields, adding or removing form fields, renaming form fields, or changing the action URL.

The incorporation of code executed on the client side in the form submission can result in an API function that includes hard-coded state information such as session IDs in the script.

The present invention also includes a method of using a recorder to record scripts that use both a parser addition and form merging instructions so that the recorded result is a script capable of automatic context management, but does not contain hard-coded state information. The recorder can automatically choose parser additions, along with configuration parameters for the parser additions, from a library of available additions. The recorder chooses those additions that are needed for the web application being recorded.

The recorder can also automatically detect the form in the user session that is most similar to a four being submitted, and generate form merging instructions into the script so that the replay engine will submit the correct form when executing the script. This recording process is called fuzzy form detection.

The replay engine follows the form merging instructions on how to merge the two forms to produce a form submission. The recorder generates these form merging instructions into the recorded script. The instructions specify which forms, form definitions, form fields, and alternate action URLs to use. The form is modeled using context-full form functions for the form fields that incorporate state information.

The recorder does not need any pre-configuration before recording, no user intervention during recording, and the scripts do not need customization by the user after recording.

The recorder automatically records the scripts without the need for user customization or a separate configuration. No manual pre-configuration for specific handling techniques is necessary since the recorder can automatically adapt to formerly unknown situations. There is no need to manually add parsing instructions for state information to the script because there is no state information statically incorporated in the recorded script.

Automatic context management using an extensible document parser and fuzzy form detection and merging enables the automatic use of dynamic data in a script. No user configuration or customization is necessary before or after recording.

Automatic context management improves the ease-of-use and overall quality of a simulation tool and improves the productivity of the QA process.

Extensible Document Parser

The present invention includes an extensible document parser 702 as shown in FIG. 7, which can parse URLs by making use of the parser addition 1401 that standard document parsers overlook. Document parsers parse documents according to the syntax of the document type. The extensible document parser 702 has added functionality over the standard document parser since the extensible document parser 702 has a plug-in interface to include one or more parser additions 703.

The parser addition 703 is a DLL (dynamic link library) having an interface that can be plugged into the extensible document parser 702. The parser addition 703 is used by the extensible document parser 702 to parse additional frames 721, embedded objects 722, hyperlinks 723 and forms 724 from the document in addition to the standard frames 711, embedded objects 712, hyperlinks 713, and forms 714 from the document.

The extensible document parser 702 passes the document to parse 701 and additional input parameters to the parser addition 703. The parser addition 703 reports the parsing results back to the extensible document parser 702 by sending output parameters through the interface in the parser addition 703 that is plugged into the extensible document parser 702.

The parser addition has another plug-in interface (1403, FIG. 14) used by the recorder. By using the parser addition, the recorder can record a script that contains parser extensions. A parser extension is a replay instruction that specifies parser additions and configuration data for the parser additions. The recorder, by invoking this plug-in interface 1403 of the parser addition, determines the appropriate parser extensions to record into the script, so that a URL or form can be parsed during replay. Parser extensions can be in effect during the entire script execution or for individual page-level replay instructions only.

The parser extension specifies a parser addition and configuration data for this parser addition. In one embodiment, the configuration data for a parser addition consists of a left and a right boundary string. The parser addition first searches for the given left boundary string within the document. At each occurrence of the left boundary string, the parser addition searches for the next occurrence of the right boundary string. The text fragment found between the boundary strings is the resulting parsed URL.

In this embodiment, the configuration data for the parsing addition are the left and right boundary strings. Other types of parser additions (e.g. a parser addition that parses the document according to a regular expression) might have different kinds of input parameters (e.g. a regular expression).

Parser Addition

A parser addition 1401 shown in FIG. 14 is a software module that provides two interfaces 1402, 1403: one for use by the extensible document parser and one for use by the recorder, respectively. The preferred embodiment is a dynamic link library (DLL) with the interfaces being exported functions. However, any technology capable of implementing plug-ins is suitable, e.g., Microsoft™ COM or an object-oriented class framework.

The interface of the parser addition 1401 for the extensible document parser 1402, referred to as "ParseDocument", receives the document to parse and additional configuration parameters that completely depend on the parser addition. The parameters for a parser addition can be anything that is meaningful to parameterize the particular algorithm that the parser addition performs. The parser addition (1401, FIG. 14; 703, FIG. 7) outputs a list of embedded objects 721, frames 722, hyperlinks 723, and forms 724.

The interface of the parser addition 1401 for the recorder 1403, referred to as "DetectParameters", is used by the recorder. The input to the parser addition 1401 through this interface is a document and either a URL or a form. The output from the parser addition 1401 through this interface includes: a) parameters that can be passed to the interface ParseDocument along with the given document so that this interface can parse the given URL or form; or b) a notification that no suitable parameters can be detected.

The recorder according to the present invention chooses a parser addition from the library of available parser additions and parameters for the chosen parser addition so that the URL or form that would otherwise be hard-coded in the script can be parsed during script replay.

The recorder relies on the parser additions to detect suitable parameters. The recorder queries each one of the parser additions available in the library of parser additions 1112 using the interface DetectParameters 1403 of each parser addition.

For each parser addition in the library and for each document in the session history, the recorder queries the parser addition if there are suitable parameters for the parser addition so that the parser addition can parse the required URL or form from the given document. Some parser additions will succeed and provide a set of suitable parameters for some of these documents.

The result is a set of triplets, each one including a document, a parser addition, and parameters for the parser addition. Among this set, the recorder chooses one triplet which is the most suitable to be used. This choice may depend on several criteria related to both the document and the parser addition. For example, a document contained in the most recently accessed web page in the session history is preferred to a document contained in a web page farther back in the session history. Also, parser additions can be tagged with an estimation of the resource consumption (CPU, memory) the parser addition will need during script replay, and the recorder chooses the parser addition with the lowest estimated resource consumption.

It might still be possible that no parser addition is able to report success. In this case, the recorder of the present invention records a context-less replay instruction in the script, like a conventional recorder. However, the probability of the recorder of the present invention recording a context-less replay instruction decreases significantly as more parser additions with different parsing algorithms are available.

If the recorder can successfully choose parser additions and parameters for the parser additions, the recorder records a replay instruction to the script that specifies that the chosen parser addition with the chosen parameters is to be used during script replay and during the execution of the replay instruction that downloads the web page containing the document in which the parser addition can parse the required URL or form. Such a replay instruction is called "parser extension".

The recorder then records a context-full replay instruction such as "FollowHyperlink" or "SubmitForm" instead of the context-less replay instruction such as "LoadPage" or "SendForm". In other words, the recorder avoids context-less script instructions (1315, 1316, FIG. 13) and instead records context-full script instructions (1313, 1314, FIG. 13).

For example, an embodiment of a parser addition is a boundary searching parser addition. The interface "ParseDocument" of the boundary searching parser addition receives a left and a right boundary string in addition to the document to parse. The parser addition first searches for the given left boundary string within the document. At each occurrence of the left boundary string the parser addition searches for the next occurrence of the right boundary string. The text fragment found between the boundary strings is the resulting URL.

The interface "DetectParameters" of the boundary searching parser addition receives the document to parse and the URL that should be the parsing result.

The parser addition determines the parameters needed for the interface "ParseDocument" by first searching the URL within the document. If the URL cannot be found, the parser addition reports failure.

Otherwise, the parser addition takes the string on the left side of the occurrence of the URL within the document and estimates the number of characters that should be included in the left boundary string based on typical string characteristics. Then, it determines the number of characters on the right side of the occurrence to make sure the right boundary string does not occur within the URL to parse. The left and right boundary strings are recorded by the recorder as parser extensions in the script.

Fuzzy Form Detection

Fuzzy form detection according to the present invention is the process that a recorder employs when searching the session history for a form that matches the form that is being submitted.

A recorder according to the present invention does not search for forms in the session history which are identical to the form being submitted. Instead, the recorder inspects all forms in all of the documents in the session history.

The recorder compares each form in the session history to the form being submitted. The result of this comparison is a set of data that describes the differences between the form being submitted and the form from the session history. This set of data includes:

Is the action URL identical or different?
How many form fields are unchanged?
How many form fields are changed?
How many form fields have been added?
How many form fields have been removed?

Based on the data from the comparison which is calculated for every form in the session history, the recorder chooses the form from the session history which is the most similar to the form being submitted. The recorder may assign levels of importance to individual differences. For example, a missing form field is a difference that is equal to five extra form fields.

If there are several forms in the session history with the same total level of difference to the form being submitted, the recorder applies additional criteria to choose among them. For example, the recorder prefers a form contained in the most recently accessed web page to a form further back in the session history.

Once the recorder has chosen the most suitable form from the session history, the recorder records a context-full replay instruction such as "SubmitForm" to the script along with merging instructions for the replay engine.

In the fuzzy form detection process, the recorder receives as input the form from the session history and the form being submitted by the recorded application and produces merging instructions for the replay engine. In the form merging process 804 as shown in FIG. 8, the replay engine receives as input the form from the session history 801 and merging instructions 802 from the script and produces as output the form to be submitted 803.

Furthermore, if the action URL of the form being submitted is different than the action URL of the form detected from the session history, the form merging instructions output to the script need to also specify a different action URL. The recorder finds a suitable parser addition and parameters for the parser addition so that a replay instruction can be recorded in the script to dynamically parse the different action URL during replay. The recorder then records form merging instructions containing a reference to the parsed action URL instead of the hard-coded action URL.

Form Merging

The present invention includes the process of form merging. Form merging instructions are contained in the script and used by the replay engine to determine how a form contained in a previously downloaded web page is merged with a form defined in the script to obtain the form that must be submitted to the web application.

The replay engine performs form merging 804 to obtain a form to be submitted 803. The form to be submitted 803 is constructed by merging a document form 801 and a script form 802 according to form merging instructions, which are part of the script form 802. The document form 801 is a form obtained by the extensible document parser and contained in a web page previously downloaded during the replay of the script. The script form 802 is a form defined in the script.

While merging the document form 801 and the script form 802, the replay engine follows form merging instructions recorded in the script to construct the form to be submitted.

The form merging instructions in the script can be a combination of, but are not limited to, the following:

Use the form field value specified in the form obtained by the document parser (i.e., the dynamic document value) for a form field of the same name in the form to be submitted.

Use the form field value specified in the form defined in the script (i.e., the static script value) for a form field of the same name in the form to be submitted.

Add a field not present in the form obtained by the document parser. The form field name, value, and location among the existing form fields are specified in the script.

Suppress the form field specified from the form obtained by the document parser.

Although the form field is contained in the form in the web page, such a form field is not submitted.

The recorder decides whether to record the merging instruction "use document value" or "use script value" during the fuzzy form detection process. The recorder records the merging instruction "use document value" for all form fields where the value is the same as the initial value in the document, and records the instruction "use script value" only for form fields where the form field value differs from the initial value in the document (i.e., for those form fields that have been filled in by the user of the web application). So only user inputs get hard-coded in the script, but not hidden form fields or other unchanged values.

The example shown in FIG. 8 illustrates how the replay engine constructs a form to be submitted 803 from a form obtained from a previously downloaded web page by use of a document parser 801 and a form definition with merging instructions from the script 802.

Form field "Product ID" 811 from the previously downloaded web page is compared to form field "Product ID" 812 from the form to be submitted. The form merging instruction 802 "use document value" specified using the fuzzy fowl detection process produces the result wherein the submitted form uses the dynamic value for "Product ID" 813 obtained from the document.

Form field "quantity" 821 from the previously downloaded web page is compared to form field "quantity" 822 from the form to be submitted. The form merging instruction 802 "use script value" specified using the fuzzy form detection process produces the result wherein the submitted form uses the scripted form field value "2" for form field "quantity" 823 from the script.

Form field "property" 831 from the previously downloaded web page is compared to form field "property" 832 from the form to be submitted. The form merging instruction 802 "remove form field" specified using the fuzzy form detection process produces the result wherein the submitted form does not contain the form field "property".

The missing form field "color" from the previously downloaded web page is compared to form field "color" 842 from the form to be submitted. The form merging instruction 802 "add form field, use script value" specified using the fuzzy form detection process produces the result wherein the submitted form contains the form in field "color" 843 and uses the form field value "blue" from the script.

Form field "SID" 851 from the previously downloaded web page is compared to form field "SID" 852 from the form to be submitted. The form merging instruction 802 "use document value" specified using the fuzzy form detection process produces the result wherein the submitted form uses the dynamic form field value for "SID" 853 from the document.

The missing form field "action" from the previously downloaded web page is compared to form field "action" 862 from the form to be submitted. The form merging instruction 802 "add form field, use script value" specified using the fuzzy form detection process produces the result wherein the submitted form contains the form field "action" 863 and uses the form field value "add to basket" from the script.

With a replay engine capable of form merging, it is possible to model web page transitions by a context-full replay instruction in situations where this would not be possible with a prior replay engine.

Examples for such situations are web application which embed incomplete forms within HTML documents, and modify these forms by means of client side code execution, e.g. JavaScript™, prior to submitting such a form. Form modifications performed by client side code may be: adding form fields, removing form fields, renaming form fields or changing values of form fields.

Reorder

The present invention includes a recorder that can choose suitable parser additions from a library of available parser additions that are needed for generating context-full replay instructions. The recorder of the present invention also performs fuzzy form detection.

The input of the recorder 1101 is a sequence of HTTP transactions as shown in FIG. 9. Each HTTP transaction is either a simple HTTP transaction 901 or a compound HTTP transaction 902.

A simple HTTP transaction includes meta data 910 (e.g., timestamps and IP addresses), a HTTP request header 911, a HTTP request body 912, a HTTP response header 913, and a HTTP response body 914. The HTTP response body 914 is the document that has been downloaded by the simple HTTP transaction.

A compound HTTP transaction includes a list of simple HTTP transactions that are related by HTTP redirections (HTTP status codes "301", "302") and/or authentications (HTTP status codes "401", "407").

The output of the recorder is a script 1001 consisting of a sequence of replay instructions 1010, 1011, 1012, 1013, 1014, 1099 as shown in FIG. 10. The replay instructions may contain form merging instructions 1010, 1012. The script can be recorded in any format that can be understood by the replay engine, e.g. plain text, XML, stored in a database, etc.

The recorder architecture is shown in FIG. 11. The recorder 1101 includes a context analyzer 1104 to process the sequence of simple or compound HTTP(S) transactions 1102, which it receives as input, one by one, as shown in FIG. 12. After processing each HTTP(S) transaction 1102, the recorder 1101 determines if there are more HTTP(S) transactions that need to be processed and continues until there are no more. The context analyzer recreates the web pages of the user session and logs these pages in the session history 1105. The context analyzer uses the extensible document parser to parse documents contained in the HTTP transactions 1102 so that it is possible to recreate web pages and identify page transitions. When the context analyzer identifies a page transition, it records a replay instruction to the script 1108 using a script generator 1106. The recorder has a library of document parser additions 1112 which are available to the extensible document parser.

The present invention includes the library of parser additions 1112 and an extensible document parser 1111 to enhance the operation of the context analyzer 1104 to ensure that the recorder records context-full replay instructions to the script 1108.

What is claimed is:

1. A recorder, comprising:
a context analyzer configured to perform processing associated with associating one or more HTTP transactions of a web application with a web session, wherein the web application executes code on the client side;
an extensible document parser configured to perform processing associated with parsing a document included in the one or more HTTP transactions;
a library of parser additions used by the context analyzer to perform processing associated with generating a context-full replay instruction, wherein the context analyzer chooses a parser addition from the library of parser additions; and
a script generator configured to perform processing associated with recording a script including the context-full replay instruction in order to recreate the one or more HTTP transactions in order to simulate use of the web application by a user;
wherein the processing is performed utilizing a processor.

2. The recorder of claim 1, wherein the context analyzer recreates and logs a web page of a user session in a session history.

3. The recorder of claim 1, wherein the recorder uses a parser addition to parse additional elements of a document.

4. The recorder of claim 1, wherein each of the one or more parser additions provides a parser extension for recording in a script.

5. The recorder of claim 1, wherein at least one of the one or more parser additions comprises a dynamic link library.

6. The recorder of claim 1, wherein the at least one HTTP transaction comprises a simple HTTP transaction and/or a compound HTTP transaction.

7. The recorder of claim 1, wherein the processing the at least one HTTP transaction comprises parsing a document using an extensible document parser.

8. The recorder of claim 1, wherein the replay instruction comprises a form merging instruction.

9. The recorder of claim 1, wherein the replay instruction comprises a context-full replay instruction.

10. A method, comprising:
performing processing associated with receiving at least one HTTP transaction;
performing processing associated with associating the at least one HTTP transaction of a web application with a web session, wherein the web application executes code on the client side;
performing processing associated with generating a context-full replay instruction, wherein the context analyzer chooses a parser addition from a library of parser additions; and
performing processing associated with recording a script comprising a replay instruction associated with the at least one HTTP transaction in order to recreate the at least one HTTP transaction in order to simulate use of the web application by a user;
wherein the processing is performed utilizing a processor.

11. The method of claim 10, wherein the processing the at least one HTTP transaction comprises parsing a document using an extensible document parser.

12. The method of claim 11, wherein the processing the at least one HTTP transaction further comprises parsing the document using a parser addition.

13. The method of claim 12, wherein the parser addition provides a parser extension and/or the parser addition comprises a dynamic link library.

14. The method of claim 10, wherein the replay instruction comprises a form merging instruction.

15. The method of claim 10, wherein the replay instruction comprises a context-full replay instruction.

16. The method of claim 10, wherein the replay instruction comprises a parser extension.

17. The method of claim 10, wherein the at least one HTTP transaction comprises a simple HTTP transaction and/or a compound HTTP transaction.

18. The method of claim 10, wherein a web page of a user session in a session history is recreated and logged.

* * * * *